(12) United States Patent
Yamashita et al.

(10) Patent No.: US 10,439,226 B2
(45) Date of Patent: Oct. 8, 2019

(54) NONAQUEOUS ELECTROLYTE BATTERY, BATTERY PACK, AND VEHICLE

(71) Applicant: Kabushiki Kaisha Toshiba, Minato-ku (JP)

(72) Inventors: Yasunobu Yamashita, Meguro (JP); Keigo Hoshina, Yokohama (JP); Yoshiyuki Isozaki, Nerima (JP); Norio Takami, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 144 days.

(21) Appl. No.: 15/455,666

(22) Filed: Mar. 10, 2017

(65) Prior Publication Data

US 2017/0294657 A1    Oct. 12, 2017

(30) Foreign Application Priority Data

Apr. 6, 2016    (JP) .................................. 2016-076688

(51) Int. Cl.
*H01M 4/62* (2006.01)
*H01M 4/485* (2010.01)
(Continued)

(52) U.S. Cl.
CPC ......... *H01M 4/628* (2013.01); *H01M 2/1077* (2013.01); *H01M 4/485* (2013.01);
(Continued)

(58) Field of Classification Search
CPC ........ H01M 4/62; H01M 4/628; H01M 4/485; H01M 10/0525; H01M 10/44; H01M 10/42; H01M 10/425
See application file for complete search history.

(56) References Cited

U.S. PATENT DOCUMENTS

2010/0248038 A1* 9/2010 Takami ................. H01M 4/364
429/332
2012/0183849 A1* 7/2012 Matsuno ................. H01M 4/13
429/211
(Continued)

FOREIGN PATENT DOCUMENTS

| JP | 2005-85545 | 3/2005 |
|---|---|---|
| JP | 2014-29872 | 2/2014 |
| JP | 2015-503196 | 1/2015 |

OTHER PUBLICATIONS

Shigeki Yamate, et al., "High Temperature Life Performance for Lithium-Ion Battery Using Lithium Titanium Oxide Negative Electrode with Electrochemically Formed Surface Film Comprising Organic-Inorganic Binary Constituents", Technical Report, vol. 6, (1), 2009, 11 pgs. (with English Abstract and machine generated English translation).

*Primary Examiner* — Karie O'Neill Apicella
(74) *Attorney, Agent, or Firm* — Oblon, McClelland, Maier & Neustadt, L.L.P.

(57) ABSTRACT

A nonaqueous electrolyte battery comprising:
a positive electrode including a positive electrode active material layer containing a lithium iron manganese phosphate composite having an olivine structure; and
a negative electrode including a negative electrode active material layer containing a titanium-containing metal oxide composite,
wherein an atomic concentration of manganese is 1 atm % or more and 15 atm % or less in a region from a surface to a depth D of the negative electrode active material layer and the depth D is more than 0 nm and 10 nm or less.

11 Claims, 3 Drawing Sheets

(51) Int. Cl.
*H01M 4/58* (2010.01)
*H01M 10/42* (2006.01)
*H01M 10/44* (2006.01)
*H01M 10/0525* (2010.01)
*H01M 2/10* (2006.01)
*H01M 4/02* (2006.01)

(52) U.S. Cl.
CPC ..... *H01M 4/5825* (2013.01); *H01M 10/0525* (2013.01); *H01M 10/425* (2013.01); *H01M 10/44* (2013.01); *H01M 2004/027* (2013.01); *H01M 2004/028* (2013.01); *H01M 2220/20* (2013.01); *Y02E 60/122* (2013.01)

(56) References Cited

U.S. PATENT DOCUMENTS

| | | |
|---|---|---|
| 2014/0342230 A1 | 11/2014 | Watanabe et al. |
| 2016/0164078 A1 | 6/2016 | Hong et al. |

* cited by examiner

FIG. 6 ical stability and conductivity when the potential with respect to lithium ion metal is in a range of 3

NONAQUEOUS ELECTROLYTE BATTERY, BATTERY PACK, AND VEHICLE

CROSS-REFERENCE TO RELATED APPLICATIONS

This application is based upon and claims the benefit of priority of the prior Japanese Patent Application No. 2016-076688 filed on Apr. 6, 2016, the entire contents of which are incorporated herein by reference.

FIELD

This disclosure relates to a nonaqueous electrolyte battery, a battery pack, and a vehicle.

BACKGROUND

Nonaqueous electrolyte batteries using a lithium ion are expected to be applied to on-vehicle applications such as micro-hybrid vehicles and idling stop systems, stationary applications, and the like since they have features such as a high energy density and a long lifespan.

An olivine-type phosphate compound as a positive electrode active material exhibiting excellent high temperature durability and a titanate metal oxide as a negative electrode active material have been paid attention in a nonaqueous electrolyte battery, respectively.

In the positive electrode active material, lithium iron phosphate having an olivine structure exhibits excellent lifetime characteristics since it has a stable crystal structure and a relatively low absorbing and releasing potential of lithium ion of about 3.4 V (vs. Li/Li+).

In the negative electrode active material, lithium titanate having a spinel structure has advantages such as excellent cycle characteristics and high safety since the volume thereof does not change in association with the charge and discharge reaction.

The cell using a titanate metal oxide as the negative electrode has a problem that the cell capacity of the nonaqueous electrolyte battery significantly deteriorates by the influence of SOC deviation or the like since the operating voltage is flat, which is a feature of a two-phase coexisting system and a side reaction by the functional group on the surface of the negative electrode active material generates a gas.

DETAILED DESCRIPTION

Hereinafter, embodiments will be described with reference to the drawings. Those with the same reference numerals indicate the same items.

The drawings are schematic or conceptual, and the relationship between the thickness and the width of each part, the ratio coefficient of the size between parts, and the like are not necessarily the same as the actual ones. In addition, the dimensions and ratio coefficients of the parts may be different from each other depending on the drawing even in the case of representing the same part.

First Embodiment

An example of a nonaqueous electrolyte battery will be described.

Figure 1A:
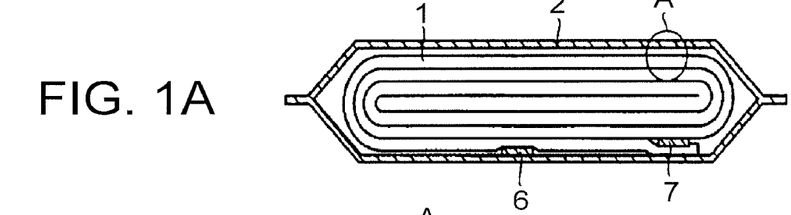
FIG. 1A is a schematic cross-sectional view of a thin nonaqueous electrolyte battery.
Figure 1B:
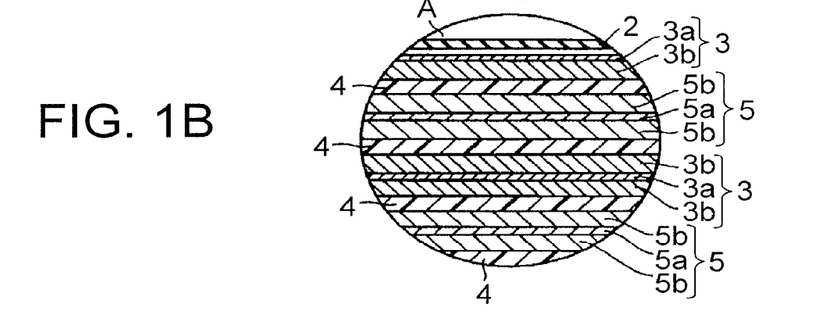
FIG. 1B is an enlarged view of the portion A.

A schematic cross-sectional view of a nonaqueous electrolyte battery is illustrated in FIG. 1A, and an enlarged view of the portion A in FIG. 1A is illustrated in FIG. 1B.

From FIG. 1A, a flat wound electrode group 1 is housed in an exterior member 2. The exterior member 2 is a bag-like exterior member formed of a laminate film in which an aluminum foil is interposed between two resin layers as an exterior member 2. From FIG. 1B, the flat wound electrode group 1 is formed by spirally winding a laminate in which a negative electrode 3, a separator 4, a positive electrode 5, and the separator 4 are laminated in this order from the outer side, and press-molding the wound laminate.

From the view in FIG. 1B, the outermost negative electrode 3 is constituted by a negative electrode current collector 3a and a negative electrode active material layer 3b formed on a surface of the inner surface side of the negative electrode current collector 3a. The negative electrodes 3 other than the outermost negative electrode are constituted by the negative electrode active material layer 3b formed on both surfaces of the negative electrode current collector 3a.

The positive electrode 5 is constituted by the member in which a positive electrode active material layer 5b is formed on both surfaces of a positive electrode current collector 5a.

A negative electrode terminal 6 is connected to the negative electrode current collector 3a of the outermost negative electrode 3. A positive electrode terminal 7 is connected to the positive electrode current collector 5a of the positive electrode 5.

The negative electrode terminal 6 and the positive electrode terminal 7 are extended to the outside through the opening portion of the bag-like exterior member. The liquid nonaqueous electrolyte is injected through the opening portion of the bag-like exterior member. The wound electrode group 1 and the liquid nonaqueous electrolyte are completely sealed by heat-sealing the opening portion of the bag-like exterior member in a state in which the negative electrode terminal 6 and the positive electrode terminal 7 are extended to the outside.

The negative electrode terminal 6 is formed of, for example, a material which exhibits electrical stability and conductivity when the potential with respect to lithium ion metal is in a range of 1 V or more and 3 V or less. The negative electrode terminal 6 is formed of, for example, an aluminum alloy containing one kind of element among Mg, Ti, Zn, Mn, Fe, Cu, and Si. The negative electrode terminal 6 may be formed of, for example, an aluminum alloy containing plural kinds of elements among Mg, Ti, Zn, Mn, Fe, Cu, and Si. It is preferable that the negative electrode terminal 6 is formed of the same material as the negative electrode current collector 3a in order to lower the contact resistance with the negative electrode current collector 3a.

The positive electrode terminal 7 is formed of a material which exhibits electrical stability and conductivity when the potential with respect to lithium ion metal is in a range of 3 V or more and 4.5 V or less. The positive electrode terminal 7 is formed of an aluminum alloy containing at least one element among Mg, Ti, Zn, Mn, Fe, Cu, and Si. The positive electrode terminal 7 may be formed of an aluminum alloy containing plural kinds of elements among Mg, Ti, Zn, Mn, Fe, Cu, and Si. It is preferable that the positive electrode terminal 7 is formed of the same material as the positive electrode current collector 5a in order to lower the contact resistance with the positive electrode current collector 5a.

Hereinafter, the negative electrode 3, the positive electrode 5, the nonaqueous electrolyte, the separator 4, the exterior member 2, the positive electrode terminal 7, and the negative electrode terminal 6 which are used in the nonaqueous electrolyte battery of this embodiment will be described in detail.

(Negative Electrode)

The negative electrode 3 includes the negative electrode current collector 3a and the negative electrode active material layer 3b.

The negative electrode current collector 3a is preferably formed of an aluminum foil or aluminum alloy foil containing one kind of element among Mg, Ti, Zn, Mn, Fe, Cu, and Si, which is electrochemically stable in a potential range of higher than 1.0 V. The negative electrode current collector 3a may be formed of an aluminum foil or aluminum alloy foil containing plural kinds of elements among Mg, Ti, Zn, Mn, Fe, Cu, and Si, which is electrochemically stable in a potential range of higher than 1.0 V.

The negative electrode active material layer 3b contains a negative electrode active material, a conductive agent, and a binder. The negative electrode active material layer 3b is formed on one surface or both surfaces of the negative electrode current collector 3a. The blending ratio among the negative electrode active material, the conductive agent, and the binder is preferably in a range in which the negative electrode active material is 70 mass % or more and 96 mass % or less, the negative electrode conductive agent is 2 mass % or more and 28 mass % or less, and the binder is 2 mass % or more and 28 mass % or less. It is concerned that the current collecting performance of the negative electrode active material layer 3b decreases and the large current characteristics of the nonaqueous electrolyte battery decrease when the amount of the conductive agent is less than 2 mass %. It is concerned that the binding property between the negative electrode active material layer 3b and the negative electrode current collector 3a decreases and the cycle characteristics decrease when the binder is less than 2 mass %. The conductive agent and the binder are each preferably 28 mass % or less from the viewpoint of increasing the capacity of the nonaqueous electrolyte battery.

A titanium-containing metal oxide is used in the negative electrode active material layer 3b. The concentration of Mn is 1 atm % or more and 15 atm % or less in a region from the surface to D nm ($0 < D \leq 10$) of the negative electrode active material layer 3b of the negative electrode 3. It is possible to cover a functional group that becomes the starting point of a side reaction on the surface of the negative electrode active material layer 3b as the concentration of Mn on the surface of the negative electrode active material layer 3b is 1 atm % or more and 15 atm % or less. The surface of the negative electrode active material layer 3b is the surface of the negative electrode active material layer 3b on the side opposite to the negative electrode current collector 3a side.

Mn oxide and metal Mn are stable even at a high temperature, so that the metal Mn is hardly decomposed in an electrolyte unlike an organic coating component. Mn oxide and metal Mn suppress gas generation and decrease a side reaction such as decomposition of the electrolyte on the surface of the negative electrode active material layer 3b so that capacity deterioration of the nonaqueous electrolyte battery can be suppressed.

The concentration of Mn on the surface of the negative electrode active material layer 3b is preferably 3 atm % or more and 10 atm % or less in order to suppress the capacity deterioration of the nonaqueous electrolyte battery. The concentration of Mn on the surface of the negative electrode active material layer 3b is more preferably 3 atm % or more and 6 atm % or less in order to suppress the capacity deterioration of the nonaqueous electrolyte battery. A sufficient effect on capacity deterioration is not obtained when the concentration of Mn on the surface of the negative electrode active material layer 3b is less than 3 atm %. On the other hand, a problem that the resistance of the electrode increases is caused when the concentration of Mn on the surface of the negative electrode active material layer 3b is 10 atm %.

Furthermore, the ratio of metal Mn to the presence amount of the entire amount of Mn contained in Mn oxide and metal Mn is 15 atm % or more and 70 atm % or less on the surface of the negative electrode active material layer 3b.

The deposition of Mn oxide on the surface of the negative electrode active material layer 3b is caused by an ion exchange with Li in the SEI (a protective film formed on the surface of the active material by charging and discharging, which shows Li diffusivity). It is possible to maintain the Li diffusion on the surface of the active material layer 3b in some extent even when the Mn oxide is formed. In contrast to this, metal Mn is formed by a reduction deposition of the Mn ion and it is able to form a stable film on the surface of the active material. However, the metal Mn significantly decreases the diffusivity of Li. Therefore, in the case where the ratio of metal Mn to the presence amount of the entire amount of Mn contained in Mn oxide and metal Mn is more than 70 atm %, an exceed amount of metal Mn comes to be deposited, so that there arises a problem of an increase of resistance. On the other hand, in the case where the ratio of metal Mn to the presence amount of the entire amount of Mn contained in Mn oxide and metal Mn is less than 15 atm %, since the deposition amount of metal Mn is small, side reactions with the electrolyte and an absorbed element, at the active material surface and so forth, are unable to be sufficiently suppressed.

In a case in which the presence amount of metal Mn on the surface of the negative electrode active material layer 3b is large, the resistance of the nonaqueous electrolyte battery increases due to the Mn having low Li diffusibility which inhibits the diffusion of Li. Hence, the ratio of metal Mn to the presence amount of the entire amount of Mn contained in Mn oxide and metal Mn is preferably 20 atm % or more and less than 50 atm % on the surface of the negative electrode active material layer 3b. The ratio of metal Mn to the presence amount of the entire amount of Mn contained in Mn oxide and metal Mn is more preferably 25 atm % or more and 40 atm % or less on the surface of the negative electrode active material layer 3b.

As the titanium-containing metal oxide to be used in the negative electrode active material layer 3b, spinel-type lithium titanate, a monoclinic β-type titanium composite oxide ($TiO_2$ (β)), an anatase-type titanium composite oxide, ramsdellite-type lithium titanate, a niobium-containing titanium oxide such as $TiNb_2O_7$ or $Li_2Na_{1.5}Ti_{5.5}Nb_{0.5}O_{14}$, a titanium-containing oxide such as $Ti_2Nb_2O_9$, and the like are preferable. In particular, spinel-type lithium titanate is preferable since it enables the nonaqueous electrolyte battery to exhibit excellent cycle characteristics and rate characteristics. The titanium-containing metal oxide to be used in the negative electrode active material layer 3b may contain a niobium composite oxide such as $Nb_2O_5$ or $Nb_{12}O_{29}$.

The negative electrode 3 is fabricated, for example, by the following method.

A negative electrode active material, a conductive agent, and a binder are suspended in a solvent to prepare a slurry. This slurry is applied on one surface or both surfaces of the negative electrode current collector 3a and dried to form the negative electrode active material layer 3b. Thereafter, pressing thereof is conducted. Alternatively, the negative electrode active material, the conductive agent, and the binder can be formed into a pellet to be used as the negative electrode active material layer 3b.

In order to set the Mn concentration (atm %) in a region from the surface to D nm (0<D≤10) of the negative electrode active material layer 3b to 1 atm % or more and 15 atm % or less, there is a method to subject the Mn compound in the negative electrode to reductive decomposition using an electrolyte containing a Mn ion. As the electrolyte, for example, it is possible to use a general nonaqueous electrolyte containing a mixed solvent such as $LiPF_6$ or $LiBF_4$ as a Li salt and propylene carbonate (PC), ethylene carbonate (EC), diethyl carbonate (DEC), or dimethyl carbonate (DMC) as an organic solvent. In addition, as the Mn ion, it is preferable to contain $MnCl_2$ or $Mn(NO_3)_2$ in the electrolyte in an amount of about 0.05 wt % or more and 3 wt % or less. In addition, as another technique, there is a technique to cover the surface of the negative electrode active material with a Mn compound through calcination (baking). Specifically, for example, a Mn ion-containing raw material such as $MnCO_3$, $MnCl_2$, or $Mn(NO_3)_2$ is mixed with the negative electrode active material so as to be at 0.05 wt % or more and 3 wt % or less in terms of Mn weight with respect to the negative electrode active material by using a ball mill. Thereafter, the mixture is subjected to the reduction at 700° C. or higher and the heat treatment at from 700° C. to 1200° C. for about from 10 to 20 hours in an inert atmosphere (Ar), whereby the surface of the negative electrode active material is covered with a Mn compound.

In addition, examples of a preferred technique may include a technique in which Mn contained in the positive electrode 5 of the electrode group 1 housed in the exterior member 2 together with the nonaqueous electrolyte is dissolved in the nonaqueous electrolyte by a predetermined high temperature treatment and metal Mn and the Mn compound are then precipitated on the surface of the negative electrode active material layer 3b. By this technique, it is possible to suppress the contamination of the electrolyte with impurities such as $NO_3^-$ and $Cl^-$. It is also possible to simultaneously form an organic compound-based coating film exhibiting Li diffusibility and an inorganic compound-based coating film containing Mn on the surface of the negative electrode active material layer 3b. It is also possible to conveniently cover the surface of the negative electrode active material with a Mn compound without adding a step such as recalcination of the active material. As the high temperature treatment, it is preferable to hold the positive electrode 5 at a charge depth of from 5% to 70% at from 60° C. to 100° C. for from 12 hours to 36 hours. The Mn compound does not sufficiently cover the surface of the negative electrode active material when the charge depth, the temperature, and the time are lower than the lower limits. On the other hand, deterioration of the active material is accelerated when they are higher than the upper limits. At this time, it is desirable that the primary particle diameter of the positive electrode active material of the positive electrode active material layer 5b is sufficiently small to be 50 nm or less. With regard to olivine-type lithium manganese iron phosphate $LiMn_{1-x-y}Fe_xA_yPO_4$ that is a positive electrode active material, it is desirable that the ratio (1-x-y) of Mn is 0.7 or more and the ratio (y) of A that is a heteroelement is about 0.5. At this time, the surface activity of the positive electrode active material increases and the dissolution of Mn in the positive electrode 5 is accelerated at the time of the high temperature treatment of the positive electrode 5. On the other hand, the stability of the bulk of the positive electrode active material increases when A of a heteroelement is added to the positive electrode 5. For this reason, dissolution of Mn is limited to the vicinity of the surface of the positive electrode 5 so that deterioration of electrode characteristics can be significantly suppressed.

(Positive Electrode)

The positive electrode 5 includes the positive electrode current collector 5a and the positive electrode active material layer 5b.

The positive electrode active material layer 5b contains a positive electrode active material, a conductive agent, and a binder. The positive electrode active material layer 5b is formed on one surface or both surfaces of the positive electrode current collector 5a. The positive electrode active material contains $LiMn_{1-x-y}Fe_xA_yPO_4$ (A is at least one kind of element selected from the group consisting of Mg, Ca, Al, Ti, Zn, and Zr, 0≤x≤0.3, 0<y≤0.1).

It is preferable that the positive electrode active material and the lithium absorbing material are blended in the positive electrode active material layer 5b in a total amount of 80 mass % or more and 95 mass % or less. It is preferable to blend the conductive agent at 3 mass % or more and 18 mass % or less. It is preferable to blend the binder at 2 mass % or more and 17 mass % or less.

It is preferable to set the amount of the conductive agent to 3 mass % or more in consideration of the conductivity of the positive electrode 5. It is possible to decrease decomposition of the nonaqueous electrolyte on the surface of the conductive agent at a high temperature when the amount of the conductive agent is 18 mass % or less.

It is possible to sufficiently enhance the binding property between the positive electrode active material layer 5b and the positive electrode current collector 5a by setting the amount of the binder to 2 mass % or more. It is possible to decrease the amount of the binder that is the insulating material blended in the positive electrode 5 by setting the amount of the binder to 17 mass % or less. It is possible to decrease the internal resistance of the positive electrode 5 by decreasing the amount of the binder that is the insulating material blended in the positive electrode 3.

The conductive agent is, for example, a carbonaceous material such as acetylene black, carbon black, graphite, carbon nanofibers, and carbon nanotubes. As the conductive material, a carbonaceous material may be used singly, or a plurality of carbonaceous materials may be used.

The binder binds the active material, the conductive agent, and the current collector. The binder is, for example, polytetrafluoroethylene (PTFE), polyvinylidene fluoride (PVdF), fluorine-based rubber, an acrylic resin, and carboxymethyl cellulose.

The positive electrode current collector 5a is preferably an aluminum foil or an aluminum alloy foil containing one kind of element among Mg, Ti, Zn, Mn, Fe, Cu, and Si. The positive electrode current collector 5a may be an aluminum foil or an aluminum alloy foil containing plural kinds of elements among Mg, Ti, Zn, Mn, Fe, Cu, and Si. It is more desirable to use an electrolytic foil positive electrode current collector 5a of which the surface is roughly processed in consideration of expansion and shrinkage of the positive electrode active material accompanying charge and discharge of the nonaqueous electrolyte battery.

The positive electrode 5 is fabricated, for example, by the following method. $LiMn_{1-x-y}Fe_xA_yPO_4$ ($0 \leq x \leq 0.3$, $0 < y \leq 0.1$), a conductive agent, and a binder are suspended in a solvent to prepare a slurry. This slurry is applied on one surface or both surfaces of the current collector and dried to form the positive electrode active material layer 5b. Thereafter, pressing thereof is conducted. Alternatively, the positive electrode active material, the conductive agent, and the binder can be formed into a pellet to be used as the positive electrode active material layer 5b.

The method for producing $LiMn_{1-x-y}Fe_xA_yPO_4$ ($0 \leq x \leq 0.3$, $0 < y \leq 0.1$) to be the positive electrode active material will be described.

$LiMn_{1-x-y}Fe_xA_yPO_4$ ($0 \leq x \leq 0.3$, $0 < y \leq 0.1$) is fabricated by a hydrothermal method. In the solid phase method that is a general ceramic synthesis method, it is concerned that the particle size of $LiMn_{1-x-y}Fe_xA_yPO_4$ ($0 \leq x \leq 0.3$, $0 < y \leq 0.1$) increases and impurities are likely to be formed. In the hydrothermal method, it is easy to dope the transition metal site in the active material crystal structure with Mg and to obtain particulate and highly crystalline $LiMn_{1-x-y}Fe_xA_yPO_4$ ($0 \leq x \leq 0.3$, $0 < y \leq 0.1$). For this reason, it is possible to minimize a decrease in electrode performance even when Mn and Fe in the vicinity of the surface of the positive electrode 5 are dissolved.

Hereinafter, an example of fabricating $LiMn_{1-x-y}Fe_xA_yPO_4$ ($0 \leq x \leq 0.3$, $0 < y \leq 0.1$) by the hydrothermal method will be described.

Lithium sulfate ($Li_2SO_4$), manganese sulfate pentahydrate ($MnSO_4 \cdot 5H_2O$) magnesium sulfate heptahydrate ($MgSO_4 \cdot 7H_2O$) iron sulfate heptahydrate ($FeSO_4 \cdot 7H_2O$), diammonium hydrogen phosphate ($(NH_4)_2HPO_4$), and sodium carboxymethyl cellulose were dissolved in pure water in a nitrogen atmosphere. At this time, the molar ratio of the metals dissolved was Li:Mn:Mg:Fe=3:0.85:0.05:0.1.

The aqueous solution in which the above substances were dissolved was put in a pressure-resistant container, sealed, and subjected to a heat treatment at 200° C. for 3 hours while being stirred. After the heat treatment, the sample was extracted by centrifugation. The sample was recovered by lyophilization (freeze-drying) to prevent aggregation of the sample powder. The sample thus recovered was pulverized (grinding) in ethanol by using a planetary ball mill. Thereafter, the sample was subjected to a heat treatment at 700° C. for 1 hour in an argon atmosphere, thereby obtaining $LiMn_{0.85}Mg_{0.05}Fe_{0.1}PO_4$. Incidentally, the carbon source of $LiMn_{0.85}Mg_{0.05}Fe_{0.1}PO_4$ is carboxymethyl cellulose, and a coating film containing carbon at 2 wt % is thus formed on the particle surface of $LiMn_{0.85}Mg_{0.05}Fe_{0.1}PO_4$.

(Nonaqueous Electrolyte)

As the nonaqueous electrolyte, a liquid nonaqueous electrolyte or a gelatinous nonaqueous electrolyte is used. The liquid nonaqueous electrolyte is prepared by dissolving the electrolyte in an organic solvent. The concentration of the nonaqueous electrolyte is preferably from 0.5 to 2.5 mol/l. The gelatinous nonaqueous electrolyte is prepared by compositing a liquid electrolyte and a polymer material.

Examples of the electrolyte may include a lithium salt such as lithium perchlorate ($LiClO_4$), lithium hexafluorophosphate ($LiPF_6$), lithium tetrafluoroborate ($LiBF_4$), lithium arsenic hexafluoride ($LiAsF_6$), lithium trifluoromethasulfonate ($LiCF_3SO_3$), or lithium bis(trifluoromethylsulfonyl)imide [$LiN(CF_3SO_2)_2$]. The electrolytes may be used singly or in combination of two or more kinds thereof. It is preferable that the electrolyte contains lithium hexafluorophosphate ($LiPF_6$).

Examples of the organic solvent may include a cyclic carbonate such as propylene carbonate (PC), ethylene carbonate (EC), or vinylene carbonate; a chain carbonate such as diethyl carbonate (DEC), dimethyl carbonate (DMC), or methylethyl carbonate (MEC); a cyclic ether such as tetrahydrofuran (THF), 2-methyltetrahydrofuran (2-MeTHF), or dioxolane (DOX); a chain ether such as dimethoxyethane (DME) or diethoethane (DEE); γ-butyrolactone (GBL), α-methyl-γ-butyrolactone (MBL), acetonitrile (AN), and sulfolane (SL). The organic solvents may be used singly or in combination of two or more kinds thereof.

A more preferred organic solvent is, for example, a mixed solvent obtained by mixing two or more kinds among propylene carbonate (PC), ethylene carbonate (EC), diethyl carbonate (DEC), dimethyl carbonate (DMC), and methylethyl carbonate (MEC) and a mixed solvent containing γ-butyrolactone (GBL). It is possible to obtain a nonaqueous electrolyte battery exhibiting excellent low temperature characteristics by using such a mixed solvent.

The polymer material is, for example, polyvinylidene fluoride (PVdF), polyacrylonitrile (PAN), and polyethylene oxide (PEO).

(Separator)

As the separator 4, for example, a porous film, a synthetic resin nonwoven fabric, or the like, formed of a material such as polyethylene, polypropylene, cellulose, or polyvinylidene fluoride (PVdF), is used. A porous film formed of polyethylene or polypropylene is preferable from the viewpoint of improving the safety of the nonaqueous electrolyte battery since it is capable of cutting off the current by being melted at a certain temperature.

(Exterior Member)

As the exterior member 2, a bag-like container made of a laminate film or a metallic container is used. As the shape of the exterior member 2, there are a flat type, a square type, a cylindrical type, a coin type, a button type, a sheet type, a laminated type, and the like. Incidentally, it may be a small battery that is mounted on a portable electronic apparatus or the like or a large battery that is mounted on a two-wheel or four-wheel motor vehicle or the like.

As the laminate film, a multilayer film having a metal layer interposed between resin films is used. The metal layer is preferably an aluminum foil or an aluminum alloy foil for weight saving. As the resin film, for example, a polymer material such as polypropylene (PP), polyethylene (PE), nylon, or polyethylene terephthalate (PET) is used. The laminate film is molded into the shape of the exterior member by being sealed through thermal fusion bonding. The thickness of the laminate film is preferably 0.2 mm or less.

The metal container is formed of aluminum or an aluminum alloy. The aluminum alloy preferably contains elements such as magnesium, zinc, and silicon. Meanwhile, the content of transition metal such as iron, copper, nickel, or chromium is preferably set to 100 ppm or less. This makes it possible to drastically improve long-term reliability and heat dissipation of the metal container in a high temperature environment. The thickness of the metal container is preferably 0.5 mm or less. The thickness of the metal container is more preferably 0.2 mm or less.

(Positive Electrode Terminal)

The positive electrode terminal 7 is electrically stable when the potential with respect to lithium ion metal is in a range of 3.0 V or more and 4.5 V or less. The positive electrode terminal 7 is formed of a material which exhibits conductivity. The positive electrode terminal 7 is formed of an aluminum alloy containing one kind or plural kinds of elements such as Mg, Ti, Zn, Mn, Fe, Cu, and Si. It is preferable that the positive electrode terminal 7 is formed of the same material as the positive electrode current collector 5a in order to lower the contact resistance with the positive electrode current collector 5a.

(Negative Electrode Terminal)

The negative electrode terminal 6 is electrically stable when the potential with respect to lithium ion metal is in a range of 1.0 V or more and 3.0 V or less. The negative electrode terminal 6 is formed of a material which exhibits conductivity. The negative electrode terminal 6 is formed of an aluminum alloy containing one kind or plural kinds of elements such as Mg, Ti, Zn, Mn, Fe, Cu, and Si. The negative electrode terminal 6 is formed of the same material as the negative electrode current collector 3a in order to lower the contact resistance with the negative electrode current collector 3a.

According to the embodiment described above, it is possible to provide a nonaqueous electrolyte battery which exhibits excellent charging characteristics.

Second Embodiment

The battery pack will be described with reference to the drawings.

Figure 2:
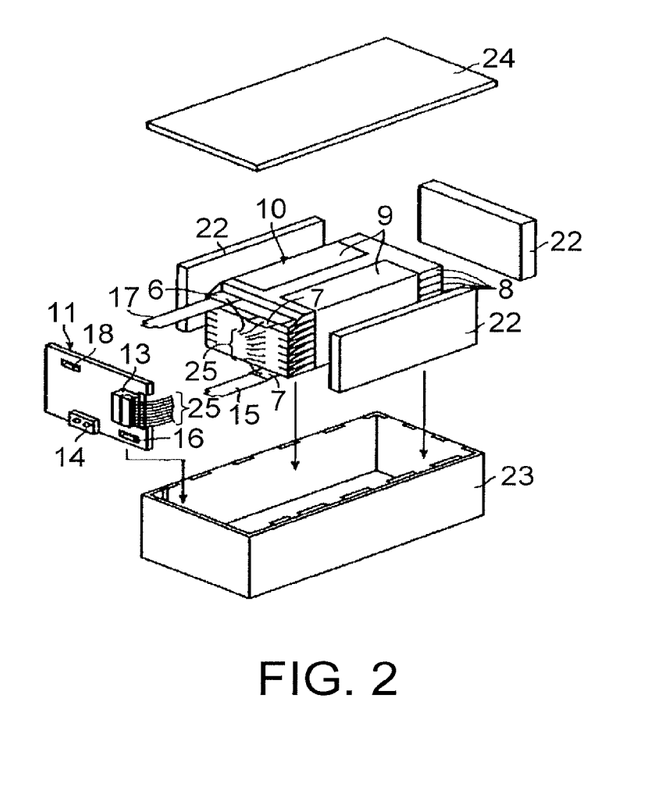
FIG. 2 is an exploded perspective view of a battery pack.

An exploded perspective view of the battery pack is illustrated in FIG. 2.

A unit battery 8 (unit cell) is constituted by a nonaqueous electrolyte battery.

As illustrated in FIG. 2, a plurality of unit batteries 8 are stacked so that the negative electrode terminal 6 and the positive electrode terminal 7 which are extended to the outside are aligned in the same direction. The plurality of unit batteries 8 are fastened with an adhesive tape 9 to constitute an assembled battery 10.

The battery pack has one unit battery 8 or a plurality of unit batteries 8 described above. In the case of including the plurality of unit batteries 8, the respective unit batteries 8 are disposed to be electrically connected in series, in parallel, or in combination of being series and parallel with one another.

The battery pack can further include a protective circuit. The protective circuit controls charge and discharge of the nonaqueous electrolyte battery 8. Alternatively, a circuit included in an apparatus (for example, an electronic apparatus or a motor vehicle) using the battery pack as a power supply can also be used as the protective circuit of the battery pack.

In addition, the battery pack can also further include an external terminal for energization. The external terminal for energization is one for outputting the current from the unit battery 8 to the outside and for inputting the current to the unit battery 8. In other words, the current is supplied to the outside through the external terminal for energization when the battery pack is used as a power supply. In addition, the charging current (including regenerative energy of the power of a motor vehicle) is supplied to the battery pack through the external terminal for energization when the battery pack is charged.

Figure 3:
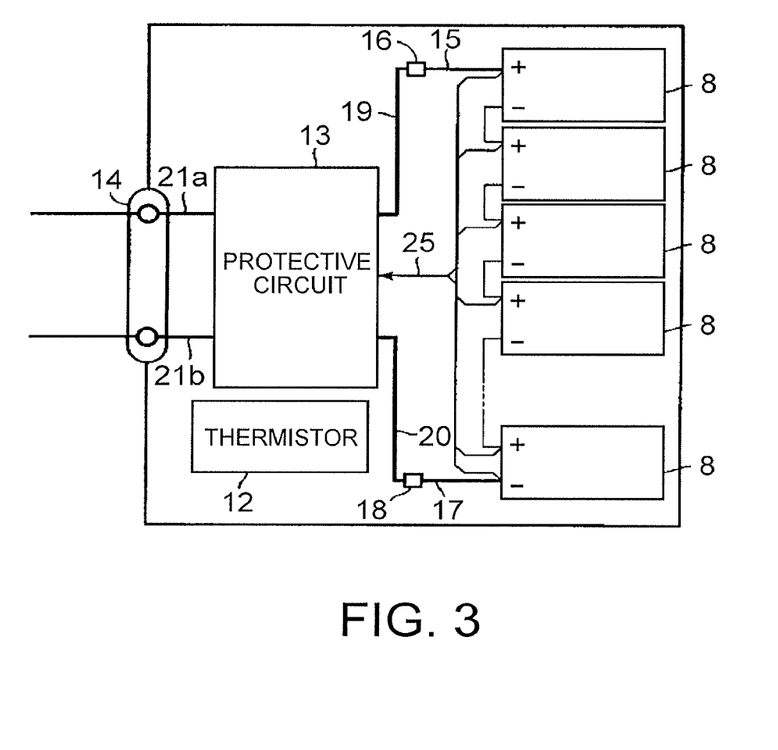
FIG. 3 is a block diagram illustrating an electric circuit in a battery pack.

The block diagram of the electric circuit of the battery pack of FIG. 2 is illustrated in FIG. 3.

As illustrated in FIG. 3, the unit batteries 8 are electrically connected in series. Hereinafter, the battery pack will be described with reference to FIG. 2 and FIG. 3.

A printed wiring board 11 is disposed to face the side surface of the unit battery 8 from which the negative electrode terminal 6 and the positive electrode terminal 7 extend. As illustrated in FIG. 3, the printed wiring board 11 is equipped with a thermistor 12, a protective circuit 13, and a terminal for energization 14 to an external apparatus. Incidentally, an insulating plate (not illustrated) is attached to the surface of the printed wiring board 11 facing the assembled battery 10 in order to avoid unnecessary connection with the wires of the assembled battery 10.

A positive electrode side lead 15 is connected to the positive electrode terminal 7 located at the lowermost layer of the assembled battery 10. The tip of the positive electrode side lead 15 is inserted into a positive electrode side connector 16 of the printed wiring board 11 to be electrically connected.

A negative electrode side lead 17 is connected to the negative electrode terminal 6 located at the uppermost layer of the assembled battery 10. The tip of the negative electrode side lead 17 is inserted into a negative electrode side connector 18 of the printed wiring board 11 to be electrically connected. These positive electrode side connector 16 and negative electrode side connector 18 are connected to the protective circuit 13 through wires 19 and 20 formed on the printed wiring board 11.

The thermistor 12 detects the temperature of the unit battery 8. The detection signal by the thermistor 12 is transmitted to the protective circuit 13.

The protective circuit 13 can cut off a positive side wire 21a and a negative side wire 21b which are present between the protective circuit 13 and the terminal for energization 14 to the external apparatus when overcharge, overdischarge, overcurrent, and the like of the unit battery 8 are detected.

The detection of overcharge and the like is conducted for each unit battery 8 or the entire unit batteries 8 (assembled battery). In the case of detecting each unit battery 8, the battery voltage may be detected or the positive electrode potential or the negative electrode potential may be detected. In the case of detecting the positive electrode potential or the negative electrode potential, a lithium electrode to be used as a reference electrode is inserted into each unit battery 8. In the case of FIG. 2 and FIG. 3, a wire 25 for voltage detection is connected to each of the unit batteries 8, and the detection signal is transmitted to the protective circuit 13 through the wire 25.

A protective sheet 22 formed of rubber or a resin is respectively disposed on three side surfaces of the assembled battery 10 excluding the side surface on which the positive electrode terminal 7 and the negative electrode terminal 6 protrude.

The assembled battery 10 is housed in a housing container 23 together with the respective protective sheets 22 and the printed wiring board 11. In other words, the protective sheet 22 is respectively disposed on both inner side surfaces in the long side direction and one inner side surface in the short side direction of the housing container 23. The printed wiring board 11 is disposed on the other inner side surface in the short side direction of the housing container 23.

The assembled battery 10 is located in the space surrounded by the protective sheet 22 and the printed wiring board 11. A lid 24 is attached to the upper surface of the housing container 23.

Incidentally, a heat shrinkable tape may be used instead of the adhesive tape 9 for fixing the assembled battery 10. In this case, the protective sheet 22 is disposed on both side surfaces of the assembled battery 10. The heat shrinkable tape is wound around both side surfaces of the assembled battery 10 and then thermally shrunk to unite the assembled battery 10.

The unit batteries 8 may be connected in parallel in order to increase the battery capacity. Alternatively, the series connection of the unit batteries 8 and the parallel connection of the unit batteries 8 may be combined. It is also possible to connect the battery packs in series or in parallel.

The battery pack is preferably applied to one which exhibits excellent cycle characteristics when a large current is taken out. Specific examples of the application of the battery pack may include a battery pack for power supply of a digital camera and a battery pack mounted on a vehicle such as a two-wheel or four-wheel hybrid electric vehicle, a two-wheel or four-wheel electric vehicle, or an assist bicycle. In particular, it is suitably mounted on a vehicle.

Figure 6:
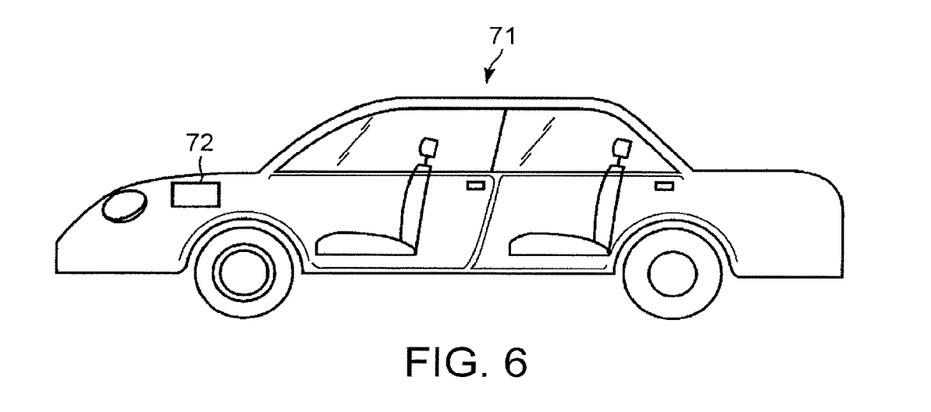
FIG. 6 is a schematic diagram showing an example of a vehicle of the embodiment

In a motor vehicle equipped with the battery pack, the battery pack recovers the regenerative energy of the power of the motor vehicle, for example. FIG. 6 shows an example of an automobile comprising the battery pack according to the second embodiment.

An automobile 71 shown in FIG. 6 includes a battery pack 72, as an example according to the second embodiment, in an engine room at the front of a vehicle body. A battery pack in an automobile may be installed at a position other than an engine room. For example, a battery pack may be installed at the rear of a vehicle body or under a seat.

Since the battery module and the battery pack of the second embodiment include the nonaqueous electrolyte battery of the first embodiment, a battery module and a battery pack superior in high-temperature storage performance and large current performance can be achieved.

Hereinafter, Examples will be described.

Example 1

A slurry was prepared by mixing 90 wt % of a positive electrode active material powder ($LiMn_{0.8}Fe_{0.15}Mg_{0.05}PO_4$), 5 wt % of acetylene black, 5 wt % of polyvinylidene fluoride (PVdF), and N-methylpyrrolidone (NMP). The slurry was applied on both surfaces of the aluminum foil positive electrode current collector 5a having a thickness of 15 μm. After the slurry was dried, the slurry was pressed, thereby fabricating the positive electrode 5 having a density of the positive electrode active material layer 5b of 2.0 g/cm³. In addition, the negative electrode 3 was fabricated by the same step using a negative electrode active material ($Li_4Ti_5O_{12}$).

A sample in which the positive electrode 5, the separator 4, the negative electrode 3, and the separator 4 were laminated in this order was spirally wound. Here, the separator 4 is fabricated by a polyethylene porous film having a thickness of 25 μm. The sample in which the positive electrode 5, the separator 4, the negative electrode 3, and the separator 4 were laminated in this order was heated and pressed at 90° C. to fabricate a flat electrode group having a width of 30 mm and a thickness of 3.0 mm. The electrode group thus obtained was housed in a pack formed of a laminate film. The laminate film housing the electrode group was vacuum-dried at 80° C. for 24 hours. The laminate film is one obtained by forming a polypropylene layer on both surfaces of an aluminum foil having a thickness of 40 μm. The total thickness of the laminate film is 0.1 mm. A liquid nonaqueous electrolyte prepared by dissolving electrolyte containing $LiPF_6$ in an organic solvent was injected into the laminate film pack housing the electrode group. The laminate film pack housing the electrode group was completely sealed by heat sealing. Thereafter, the nonaqueous electrolyte battery was held at 80° C. and a charge depth of 20% for 24 hours as a high temperature treatment. A nonaqueous electrolyte battery having the structure illustrated in FIG. 1 described above, a width of 35 mm, a thickness of 3.2 mm, and a height of 65 mm was manufactured.

Hereinafter, the evaluation methods of the nonaqueous electrolyte battery will be described.

(Charge and Discharge Cycle Test)

Charge and discharge of the nonaqueous electrolyte battery thus obtained is conducted 100 cycles at 70° C. and 2 C rate in a voltage range of from 2.7 to 1.5 V. The capacity retention (%) which indicates to what extent the capacity of the nonaqueous electrolyte battery after being subjected to charge and discharge 100 cycles is maintained as compared to the initial capacity is examined.

(XPS Analysis (X-Ray Photoelectron Spectroscopy))

After the charge and discharge cycle test, the nonaqueous electrolyte battery is disassembled in an inert gas (Ar) atmosphere to take out the negative electrode 3. The negative electrode 3 thus obtained is washed with dimethyl carbonate and vacuum-dried for 30 minutes. The surface of the negative electrode active material layer 3b on the side opposite to the negative electrode current collector 3a side of the dried negative electrode 3 is subjected to XPS analysis. Incidentally, the measurement conditions for XPS analysis are as follows: the measurement area is φ 800 μm, the sputtering rate is 2.9 nm/min, and the AlKα ray is used as the radiation source. An arbitrary point on the surface of the negative electrode active material layer 3b is subjected to XPS analysis two times and the average value thereof is adopted as the value of this embodiment. A complex type electron spectroscopic analyzer (ESCA-5800 manufactured by Physical Electronics, Inc.) was used as an apparatus for XPS analysis.

(Quantification of Mn)

The background is subtracted by the ShIrley method from the XPS spectrum of Mn 2p orbital obtained by the XPS analysis. Thereafter, spectrum was fitted with the sum of a peak derived from metal Mn having a peak top in the vicinity of 638 eV and a Mn compound having a peak top in the vicinity of 641 eV by using a mixed function of the Gaussian function and the Lorenz function. Thereafter, the element was quantified from the area of each peak top.

Figure 4:
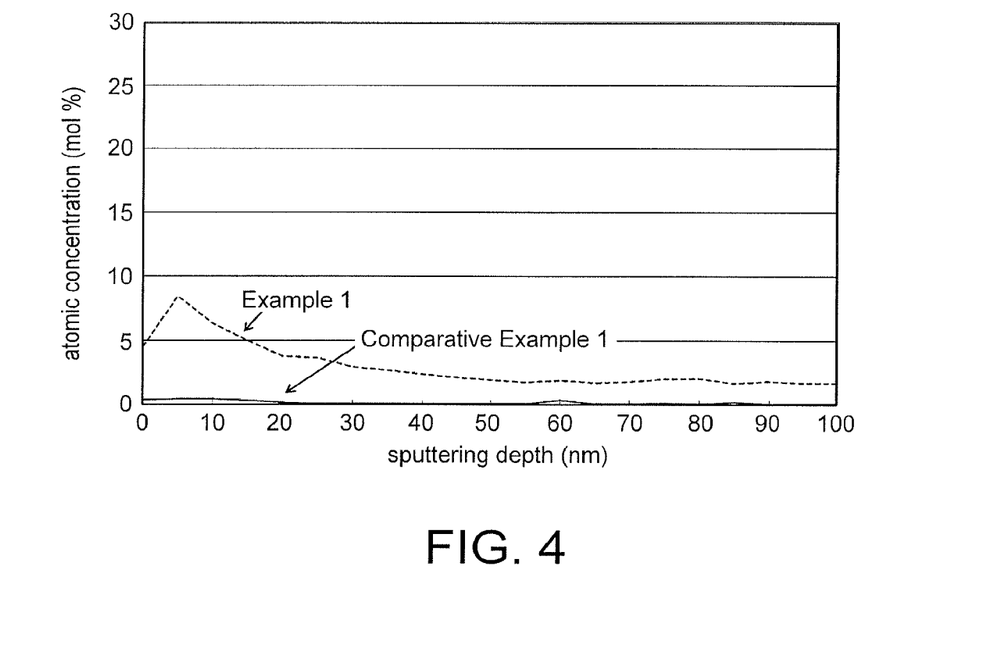
FIG. 4 is an XPS analysis chart of a negative electrode surface.

The XPS spectrum of Mn in the negative electrode active material layer 3b of the negative electrode 3 is illustrated in FIG. 4.

The XPS spectrum of Mn of Example 1 and the XPS spectrum of Mn of Comparative Example to be described later are illustrated in FIG. 4. The horizontal axis represents the depth (nm) from the surface of the negative electrode active material layer 3b, and the vertical axis represents the atomic concentration (mol %). The presence amount of Mn is from 4.9 atm % to 8.5 atm % in a region from the surface to D nm (0<D≤10) of the negative electrode active material layer 3b.

Figure 5:
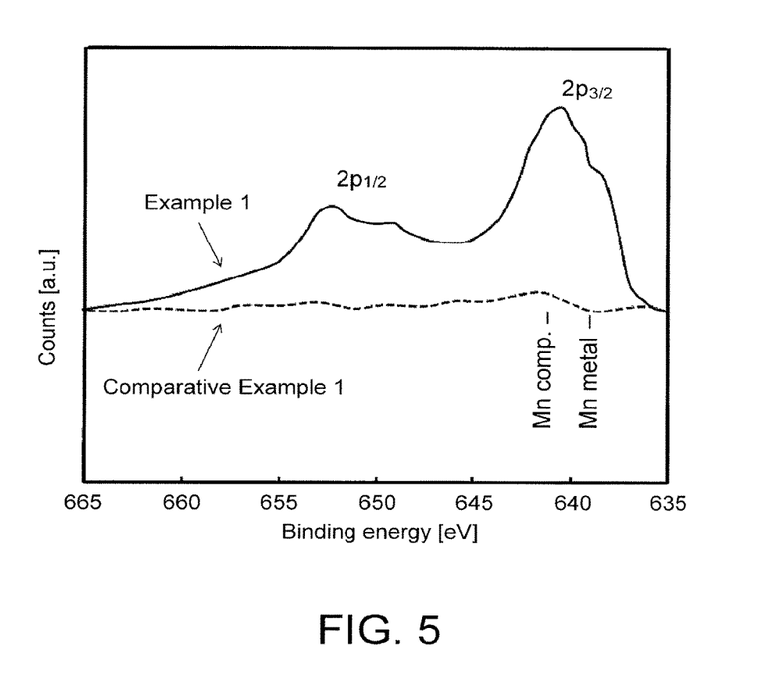
FIG. 5 is an XPS analysis chart of a negative electrode surface.

The XPS spectra derived from the Mn compound and metal Mn on the surface of the negative electrode active material layer 3b are illustrated in FIG. 5.

The horizontal axis represents the binding energy (eV) and the vertical axis represents the intensity.

The peak in the vicinity of 638 eV is a peak derived from metal Mn. The peak in the vicinity of 642 eV is a peak derived from the Mn compound.

The ratio of metal Mn to the entire amount of Mn on the surface of the negative electrode active material layer 3b was 33.5 atm %.

The capacity retention of the nonaqueous electrolyte battery after the charge and discharge test of 100 cycles was 99.8%.

The results for the XPS analysis and the cycle characteristic test of Example 1 are presented in Table 1. The results for those of Examples 2 to 5 and Comparative Examples 1 to 5 to be described later are also presented in Table 1.

Example 2

A nonaqueous electrolyte battery was fabricated by using a monoclinic β-type titanium composite oxide (TiO$_2$ (β)) as the negative electrode active material. Fabrication of the laminate cell, the high temperature treatment, the XPS analysis, and the cycle characteristic test were conducted in the same manner as in Example 1 described above.

The presence amount of Mn was from 6.2 atm % to 11.4 atm % in a region from the surface to D nm (0<D≤10) of the negative electrode active material layer 3b. The ratio of metal Mn to the entire amount of Mn on the surface of the negative electrode active material layer 3b was 40.7 atm %. In addition, the capacity retention of the nonaqueous electrolyte battery after the charge and discharge test of 100 cycles at 60° C. was 97.5%.

Example 3

A nonaqueous electrolyte battery was fabricated by using a niobium-containing titanium oxide (TiNb$_2$O$_7$) as the negative electrode active material. Fabrication of the laminate cell, the high temperature treatment, the XPS analysis, and the cycle characteristic test were conducted in the same manner as in Example 1 described above.

The presence amount of Mn was from 3.0 atm % to 8.0 atm % in a region from the surface to D nm (0<D≤10) of the negative electrode active material layer 3b. The ratio of metal Mn to the entire amount of Mn on the surface of the negative electrode active material layer 3b was 20.3 atm %. In addition, the capacity retention of the nonaqueous electrolyte battery after the charge and discharge test of 100 cycles at 60° C. was 96.5%.

Example 4

A nonaqueous electrolyte battery was fabricated by using Li$_2$Na$_{1.5}$Ti$_{5.5}$Nb$_{0.5}$O$_{14}$ as the negative electrode active material. Fabrication of the laminate cell, the high temperature treatment, the XPS analysis, and the cycle characteristic test were conducted in the same manner as in Example 1 described above.

The presence amount of Mn was from 6.2 atm % to 13.4 atm % in a region from the surface to D nm (0<D≤10) of the negative electrode active material layer 3b. The ratio of metal Mn to the entire amount of Mn on the surface of the negative electrode active material layer 3b was 42.1 atm %. In addition, the capacity retention of the nonaqueous electrolyte battery after the charge and discharge test of 100 cycles at 60° C. was 92.5%.

Example 5

A nonaqueous electrolyte battery was fabricated by using LiMn$_{0.6}$Fe$_{0.4}$PO$_4$ as the positive electrode active material and Li$_2$Ti$_5$O$_{12}$ as the negative electrode active material. Fabrication of the laminate cell, the high temperature treatment, the XPS analysis, and the cycle characteristic test were conducted in the same manner as in Example 1 described above.

The presence amount of Mn was from 6.2 atm % to 13.4 atm % in a region from the surface to D nm (0<D≤10) of the negative electrode active material layer 3b. The ratio of metal Mn to the entire amount of Mn on the surface of the negative electrode active material layer 3b was 42.1 atm %. In addition, the capacity retention of the nonaqueous electrolyte battery after the charge and discharge test of 100 cycles at 60° C. was 98.2%.

Comparative Example 1

A nonaqueous electrolyte battery was fabricated without conducting the high temperature treatment in Example 1.

The presence amount of Mn was from 0.1 atm % to 0.4 atm % in a region from the surface to D nm (0<D≤10) of the negative electrode active material layer 3b. The ratio of metal Mn to the entire amount of Mn on the surface of the negative electrode active material layer 3b was 6.0 atm %. In addition, the capacity retention of the nonaqueous electrolyte battery after the charge and discharge test of 100 cycles at 60° C. was 85.3%.

Comparative Example 2

A nonaqueous electrolyte battery was fabricated without conducting the high temperature treatment in Example 2.

The presence amount of Mn was from 0.4 atm % to 2.0 atm % in a region from the surface to D nm (0<D≤10) of the negative electrode active material layer 3b. The ratio of metal Mn to the entire amount of Mn on the surface of the negative electrode active material layer 3b was 14.6 atm %. In addition, the capacity retention of the nonaqueous electrolyte battery after the charge and discharge test of 100 cycles at 60° C. was 70.0%.

Comparative Example 3

A nonaqueous electrolyte battery was fabricated without conducting the high temperature treatment in Example 3.

The presence amount of Mn was from 0.2 atm % to 1.0 atm % in a region from the surface to D nm (0<D≤10) of the negative electrode active material layer 3b. The ratio of metal Mn to the entire amount of Mn on the surface of the negative electrode active material layer 3b was 10.5 atm %. In addition, the capacity retention of the nonaqueous electrolyte battery after the charge and discharge test of 100 cycles at 60° C. was 86.1%.

Comparative Example 4

A nonaqueous electrolyte battery was fabricated without conducting the high temperature treatment in Example 4.

The presence amount of Mn was from 0.8 atm % to 2.1 atm % in a region from the surface to D nm (0<D≤10) of the negative electrode active material layer 3b. The ratio of metal Mn to the entire amount of Mn on the surface of the negative electrode active material layer 3b was 10.3 atm %. In addition, the capacity retention of the nonaqueous electrolyte battery after the charge and discharge test of 100 cycles at 60° C. was 78.0%.

Comparative Example 5

A nonaqueous electrolyte battery was fabricated without conducting the high temperature treatment in Example 5.

The presence amount of Mn was from 0.0 atm % to 0.2 atm % in a region from the surface to D nm (0<D≤10) of the negative electrode active material layer 3b. The ratio of metal Mn to the entire amount of Mn on the surface of the negative electrode active material layer 3b was 5.0 atm %. In addition, the capacity retention of the nonaqueous electrolyte battery after the charge and discharge test of 100 cycles at 60° C. was 83.2%.

TABLE 1

|  | Positive electrode | Negative electrode | Amount of Mn (atm %) | Ratio of metal Mn to entire amount of Mn (atm %) | Capacity retention (%) |
|---|---|---|---|---|---|
| Example 1 | $LiMn_{0.8}Fe_{0.15}Mg_{0.05}PO_4$ | $Li_4Ti_5O_{12}$ | 4.9-8.5 | 33.5 | 99.8 |
| Example 2 | $LiMn_{0.8}Fe_{0.15}Mg_{0.05}PO_4$ | $TiO_2(B)$ | 6.2-11.4 | 40.7 | 97.5 |
| Example 3 | $LiMn_{0.8}Fe_{0.15}Mg_{0.05}PO_4$ | $TiNb_2O_7$ | 3.0-8.0 | 20.3 | 96.5 |
| Example 4 | $LiMn_{0.8}Fe_{0.15}Mg_{0.05}PO_4$ | $Li_2Na_{1.5}Ti_{5.5}Nb_{0.5}O_{14}$ | 6.2-13.4 | 42.1 | 92.5 |
| Example 5 | $LiMn_{0.6}Fe_{0.4}PO_4$ | $Li_4Ti_5O_{12}$ | 3.6-5.0 | 15.7 | 98.2 |
| Comparative Example 1 | $LiMn_{0.8}Fe_{0.15}Mg_{0.05}PO_4$ | $Li_4Ti_5O_{12}$ | 0.1-0.4 | 6.0 | 85.3 |
| Comparative Example 2 | $LiMn_{0.8}Fe_{0.15}Mg_{0.05}PO_4$ | $TiO_2(B)$ | 0.4-2.0 | 14.6 | 70.0 |
| Comparative Example 3 | $LiMn_{0.8}Fe_{0.15}Mg_{0.05}PO_4$ | $TiNb_2O_7$ | 0.2-1.0 | 10.5 | 86.1 |
| Comparative Example 4 | $LiMn_{0.8}Fe_{0.15}Mg_{0.05}PO_4$ | $Li_2Na_{1.5}Ti_{5.5}Nb_{0.5}O_{14}$ | 0.8-2.1 | 10.3 | 78.0 |
| Comparative Example 5 | $LiMn_{0.6}Fe_{0.4}PO_4$ | $Li_4Ti_5O_{12}$ | 0.0-0.2 | 5.0 | 83.2 |

As presented in Table 1, in Examples 1 to 5, the concentration of Mn was from 3.0 to 13.4 atm % in a region from the surface to the depth D nm (0<D≤10), in other words, in a region from the surface to the depth of 10 nm, of the negative electrode active material layer 3b.

In addition, in Examples 1 to 5, the ratio of metal Mn to the entire amount of Mn was from 15.7 to 42.1 atm % on the surface of the negative electrode active material layer 3b. The ratio is represented by the atomic percentages of the Mn atoms.

Incidentally, Mg was used as the element A in Embodiments 1 to 4, but A may be at least one kind of element selected from the group consisting of Mg, Ca, Al, Ti, Zn, and Zr.

Several embodiments of the present invention have been described, but these embodiments have been presented by way of example and are not intended to limit the scope of the invention. This embodiment can be implemented in various other forms, and various omissions, substitutions, and modifications can be made without departing from the gist of the invention. This embodiment and its modifications are included in the scope and gist of the description as well as the invention described in the claims and the equivalent scope thereof.

What is claimed is:

1. A nonaqueous electrolyte battery comprising:
a positive electrode including a positive electrode active material layer containing a lithium iron manganese phosphate composite having an olivine structure; and
a negative electrode including a negative electrode active material layer containing a titanium-containing metal oxide composite,
wherein an atomic concentration of manganese is 1 atm % or more and 15 atm % or less in a region from a surface to a depth D of the negative electrode active material layer and the depth D is more than 0 nm and 10 nm or less, and
the atomic concentration of manganese has a peak and the peak is located in a region of a depth of more than 0 nm and 10 nm or less under the surface of the negative electrode active material layer.

2. The nonaqueous electrolyte battery according to claim 1, wherein the positive electrode active material layer contains $LiMn_{1-x-y}Fe_xA_yPO_4$ (A is at least one kind of element selected from the group consisting of Mg, Ca, Al, Ti, Zn, and Zr, 0<x≤0.3, 0≤y≤0.1).

3. The nonaqueous electrolyte battery according to claim 1, wherein the titanium-containing metal oxide composite contains at least one kind among a niobium-containing titanium oxide, spinel-type lithium titanate, and a monoclinic β-type titanium composite oxide.

4. The nonaqueous electrolyte battery according to claim 1, wherein a ratio of metal manganese to the entire amount of manganese on a surface of the negative electrode active material layer is 15 atm % or more and 70 atm % or less.

5. The nonaqueous electrolyte battery according to claim 1, wherein a surface atomic concentration of manganese of the negative electrode active material layer is 3 atm % or more and 10 atm % or less.

6. A battery pack comprising the nonaqueous electrolyte battery according to claim 1.

7. The battery pack according to claim 6, further comprising:
an external power distribution terminal; and
a protective circuit.

8. The battery pack according to claim 6, further comprising a plural of the nonaqueous electrolyte batteries,
wherein the nonaqueous electrolyte batteries are electrically connected in series, in parallel, or in a combination of in series and in parallel.

9. A vehicle comprising the battery pack according to claim 6.

10. The vehicle according to claim 9, wherein the battery pack is configured to recover a regenerative energy of a power of the vehicle.

11. The nonaqueous electrolyte battery according to claim 1, wherein the atomic concentration of manganese in a region from the surface to the depth of 10 nm is higher than the atomic concentration of manganese in an interior region that is deeper than the depth of 10 nm under the surface of the negative electrode active material layer.

\* \* \* \* \*